Oct. 2, 1934.    W. SUPPER    1,975,183
IMPACT RECORDER
Filed March 14, 1932
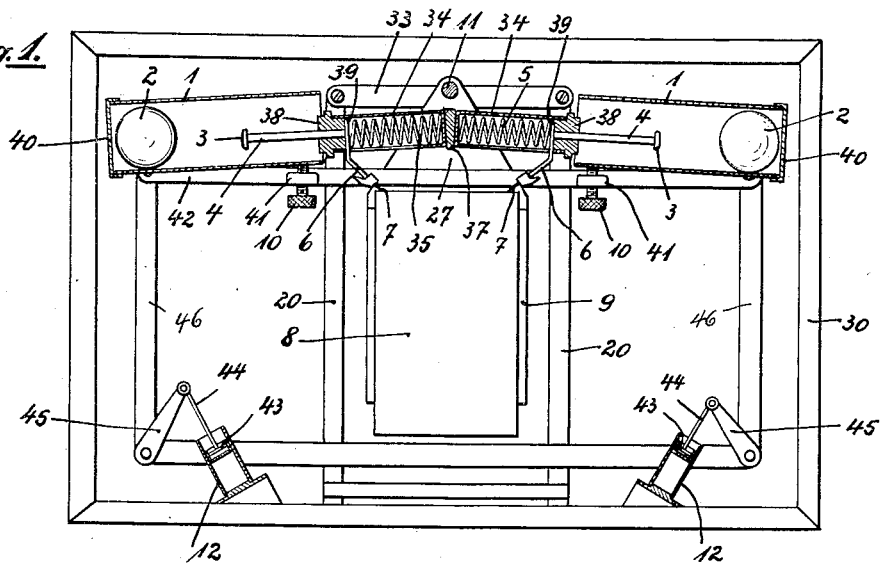
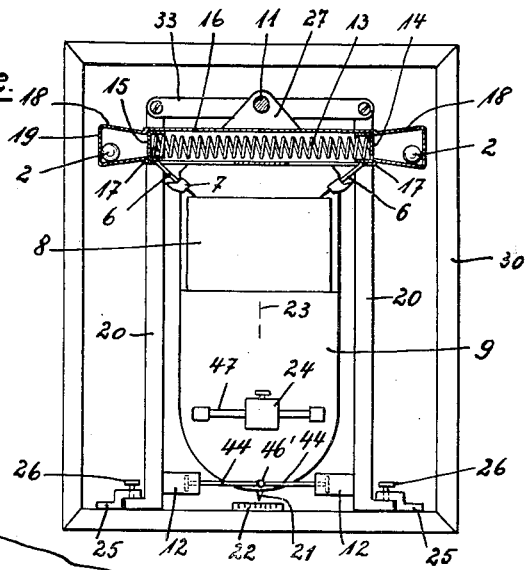
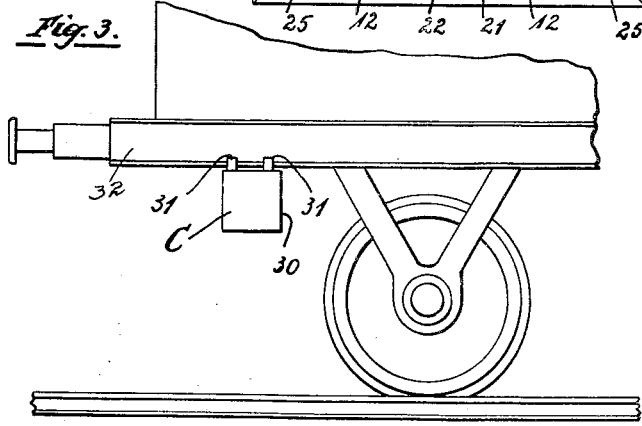
Inventor:
Walter Supper
by Karl Michaelis
Atty.

Patented Oct. 2, 1934

1,975,183

UNITED STATES PATENT OFFICE 1,975,183

IMPACT RECORDER

Walter Supper, Esslingen-on-the-Neckar, Germany

Application March 14, 1932, Serial No. 598,762
In Germany March 18, 1931

1 Claim. (Cl. 234—5.6)

My invention relates to apparatus for recording inertia forces on moving units, and more particularly to apparatus for recording the energy of the horizontal impacts or pushes which occur when a vehicle, such as a railway car, encounters an obstacle. In such cases, if damage to the vehicle or to its load occurs, it is desirable to ascertain who is responsible for the damage, i. e. whether or not the operator, for instance a shunting master, an engine driver, or the driver of a road vehicle, allowed the vehicle to run too fast.

My invention relates particularly to the recording of the residual energy, i. e. that amount of the impact energy which is not consumed by resilient means, such as buffers, on the vehicle and therefore may damage the vehicle and/or its load. For a given speed at which the vehicle encounters an obstacle, this residual energy is a function of the relative velocity at which the obstacle is encountered. For instance, a railway car may encounter a bumping post or another vehicle which stands still or moves in the opposite direction to that of the encountering vehicle, or both vehicles may move in the same direction. In view of these various conditions the speed of the vehicle itself is not always the determining factor for the residual energy. Nor is it possible to measure the residual energy by the compression of the buffer springs or other resilient means, firstly because such springs are so designed as to be fully compressed under normal operating conditions, and secondly because the push from which the damage results, need not necessarily strike the buffers, springs or the like.

It is an object of my invention to provide a recorder which indicates the residual energy of the horizontal impacts or pushes independently of other shocks, jerks and the like which occur in normal operation, and independently of the inclination of the line or road. To this end I arrange, in combination with a resisting member and recording means operatively connected to the member, a track which is inclined to horizontal, with its upper end adjacent the resisting member. On this inclined track I mount a movable weight which under the action of inertia moves the resisting member out of its initial position and operates the recording means.

Normally the resisting member is a spring which is compressed when the weight strikes it and the recording means is a stylus which sets down the amount of residual energy on a recording strip. Preferably the recording strip is moved at a predetermined velocity by clockwork or the like and bears marks for indicating the time at which the recorder was operated.

In cases where it is desirable to record the residual energy for both directions in which the vehicle moves, for instance, in the case of a railway car, the recorder is duplicated by providing two tracks, each with a weight, preferably a ball, so that when a push acts on the vehicle, only one of the balls is operated and operates in turn the corresponding stylus of the recording means.

As the track or tracks for the weight or weights is inclined to horizontal the weight, in order to operate the recording means, must ascend a rise and so is prevented from operating under normal running conditions of the vehicle and in the case of impacts or pushes which are not detrimental.

The inclination of the track also causes the weight to return automatically to its initial position after it has operated the recording means. The track, or each track, may be an inclined cylinder or a hollow flaring or conical member, with its small end turned toward the resisting member or spring.

An apparatus of the kind described will register only the residual energy of pushes which remains after a portion of it has been consumed by the buffers, the underframe, the walls of the car body, and the like. By combining the recording means with a clockwork as described, it is possible to ascertain the time at which the damage has occurred, and particularly in railway operation it can be ascertained whether the damage occurred during shunting and whether the shunting men are guilty of carelessness.

When shunting, stop blocks are placed on the rails at a suitable distance from obstructions in order to prevent heavy pushes and collisions when making up trains. If the shunting men are careless in this respect my recorder will show it up and therefore has an educational influence in railway operation and particularly in shunting.

A system of units may be established as standards for the residual energy. The standard units are preferably determined by recording the residual energy when the vehicle encounters a fixed obstacle such as a bumping post at various speeds. The residual energy recorded under this condition is the standard for measuring the residual energy under other conditions. For instance, the standard units of residual energy may be designated by a letter and a numeral indicating the speed at which the vehicle encountered the bumping post or the like. Thus, "R3" stands for the residual energy at a speed of three miles p. h., "R4" stands for the energy at four miles p. h., and "R5" stands for the energy at five miles p. h., etc.

If, for instance, it has been found experimentally in the manner described, that an impact having the residual energy "R5" will damage the load and if in the case of an accident a residual energy of "R5" or more is recorded, it is clear that the damage which has been done is due to the residual energy while if the energy recorded is less than "R5" it is equally clear that the damage must be due to other causes.

My recorder consequently eliminates to a certain degree uncertainty and guessing about the cause of the damage and provides conclusive records instead.

In the drawing affixed to this specification and forming part thereof two types of impact recorders embodying my invention are illustrated diagrammatically by way of example.

In the drawing

Fig. 1 is an elevation of a frame and a double-spring recorder, with the recorder partly in vertical section, Fig. 2 is an elevation of a frame with a single-spring recorder, also with the recorder partly in vertical section, and Fig. 3 is an elevation showing diagrammatically the end of a railway vehicle with my recorder attached to it.

Referring now to the drawing, 30 is a frame or casing which is preferably so designed that its interior is not accessible to unauthorized persons, and equipped with means such as the hooks 31, 31, Fig. 3, for securing it to a flange, of a bar 32 forming part of the carriage frame, or in any other suitable position.

20 are a pair of uprights on the bottom of the frame or casing 30, 33 is a horizontal transverse bar at the upper ends of the uprights and 11 is a pivot at the centre of the bar 33 on which is mounted to rock a bracket 27. This bracket supports the members of the recorder as will now be described.

The recorder illustrated in Fig. 1 is of the double-spring type. The springs 5 and 35 are mounted in tubular casings 34 the inner ends of which are connected to a transverse stay 37 of the bracket 27. At its outer end each cylinder 34 is equipped with a cylinder cover 38. A push bar 4 is mounted to slide in the corresponding cover 38, and equipped with a buffer plate 3 at its outer end, and a spring plate 39 at the inner end. 6 is an arm projecting downwardly from each spring plate 39 through a slot in the corresponding cylinder 34 and 7 is a stylus at the lower end of each arm 6. The styli mark on a record strip 8 which is moved past them by means of a clockwork or some other motor in the casing 9 and suitable cylinders. The record strip bears time-indicating marks.

Secured to the outer end of each cylinder 34 is a track here shown as an inclined cylinder 1 with its highest point at the end which adjoins the corresponding cylinder 34, a cover 40 at its opposite or lower end, and a weight here shown as a ball 2 which is free to roll on the bottom of its cylinder 1. Means (not shown) may be provided for regulating the tension of the springs 5 and 35. Their tension and the inclination of the cylinders or tracks 1 determine which pushes will be recorded, being detrimental and which pushes will not be recorded, being harmless. Means such as adjusting screws 10 may be arranged in suitable transverse bars 41 which are secured to the bracket 27, for varying the inclination of the cylinders or tracks 1. The outer ends of the cylinders or tracks are pivotally or resiliently connected to opposite ends of a rod 42 which extends from opposite sides of the bracket 27.

The influence of the inclination of the road or line is eliminated by suspending the bracket 27, with all parts mounted thereon, from the pivot 11. Preferably damping means such as fluid or hydraulic cylinders 12 may be provided in order to prevent oscillation of the recorder bracket. Each cylinder is equipped with a piston 43 whose piston rod 44 is pivoted to an arm 45 on a frame 46 extending downwardly from the outer ends of rod 42.

In operation the springs 5 and 35 are adjusted in conformity with the residual energy to be recorded. Obviously, if the springs are under low initial tension, comparatively slight pushes will operate them, while if they are under higher tension they will react only on heavy pushes. The balls or weights 2 are normally at the outer ends of their inclined tracks or cylinders 1 and the inclination of the tracks or cylinders, as mentioned, prevents operation of the recorder under the influence of slight pushes, shocks or jerks such as will occur in normal running. Such irregularities will not cause the balls to move away from their cylinder covers 40 at all, or they will move them to a short distance only, as shown for the ball 2 at the left in Fig. 1. If the push is so heavy that its residual energy comes within the range which may cause damage to the vehicle or its load, the recorder is operated. Suppose that the vehicle to which the frame 30 is attached, runs from the left to the right in Fig. 1 and that it encounters an obstacle and undergoes an abrupt deceleration. The leading ball 2 at the right will not move as it is retained by its cylinder cover 40, but the trailing ball 2 at the left rises on the incline of the track, strikes the buffer plate 3 of the rod 4 of spring 35, compresses the spring and causes its stylus 7 to mark on the record strip 8. This not only indicates the residual energy but also the time at which the accident happened so that a complete and conclusive record is made. When the energy of the impact has become exhausted the ball 2 returns to its initial position at the outer end of the track 1 by gravity.

The record strip presents a flat face to the styli which move on converging lines in parallel to the axis of the corresponding spring 5, or 35. Means such as springs (not shown) may be provided for applying the styli to the strip in all relative positions, or the styli themselves may be resilient.

The clockwork or other motor for operating the record strip 8 should be so heavy that the equilibrium is not easily disturbed and particularly that the movements of the balls or weights 2 on their tracks or cylinders 1 will not disturb it. In a railway line inclines normally are so slight that considerable departures from the position of equilibrium will not occur and therefore the play of the bracket 27 and the parts connected to it with respect to the casing 30 need only be slight, as shown in Fig. 1. Obviously, more play is required for road vehicles on steep mountain roads.

Preferably the shafts of the clockwork or other motor for operating the record strip 8 are placed in the direction in which the vehicle moves or in which the pushes normally occur, so that bending of the shafts through inertia forces will not occur.

Referring now to Fig. 2, the frame 30 with its uprights 20 etc. is designed as described but in this instance the two springs 5 and 35 are replaced by a single spring 13 in a single cylinder or tube 16. This reduces the overall length of the recorder. Its length is further reduced by replacing the rods 4 by plungers 14 and 15 at opposite ends of the spring 13 which are retained by shoulders 17 at opposite ends of the cylinder. The cylinders 1 are here replaced by conical sleeves 18 at opposite ends of the cylinder 16, each with an end plate or cover 19. A ball 2 is placed in each sleeve 18. The inclination of the track is obtained by the taper of the sleeves 18 but obviously means such as the screws 10 in Fig. 1, might be provided for regulating the inclination. The arms 6 of the styli 7 are connected respectively to the plungers 14 and 15. Means (not shown) may be provided for regulating the initial tension of spring 13.

The operation is the same as described with reference to Fig. 1. Under the conditions described the ball 2 at the left in Fig. 2 strikes the plunger 15, compresses the spring 13 and causes the corresponding stylus 7 to mark on the record strip 8. The shoulders 17 or other means (not shown) for limiting the outward movement of plungers 14 and 15 must evidently be so designed as not to interfere with the return movement of the balls 2, as otherwise the balls might be caught between the plungers 14, 15 and the abutting members.

A further reduction of the overall length in Fig. 2 is effected by arranging the damping cylinders 12, 12 in line with each other and securing their heads to the uprights 20. Their piston rods 44 are connected to a single pin 46' at the bottom of the clockwork casing 9. The uprights 20 are connected to the bottom of the casing 30 by brackets 25 and set screws 26 so that the recorder may be removed from and inserted in, the casing 30 as a self-contained unit.

Means may be provided for facilitating the exact adjusting of the recorder in its position of equilibrium. The means which will be described with reference to Fig. 2, may obviously also be provided on the recorder illustrated in Fig. 1. 21 is an indicator at the lower end of the clockwork casing 9 which indicator is here shown as secured to the central pin 46', 22 is a scale on the bottom of the frame or casing 30 with which the indicator cooperates, 24 is a weight which is mounted to slide on a rod 47 on the casing 9 and 23 is a mark for indicating the position of the weight 24 with respect to the casing 9. When the recorder is fitted the weight 24 is shifted until the indicator 21 is at the centre of the scale 22, so that any irregularities in the distribution of weight in the recorder are made up for.

It is an important distinction from apparatus having a pendulum with a weight, or a single weight, that in my apparatus the weights 2 move toward the axis of gravity which is a vertical through pin 11, while in the apparatus referred to the pendulum or the weight moves away from the axis of gravity. It will be understood that the tracks 1 are inclined to the horizontal and their upper ends are positioned nearer to the pivot or through-pin 11 than their lower ends.

I wish it to be understood that I do not desire to be limited to the exact details of construction shown and described for obvious modifications will occur to a person skilled in the art.

I claim:—

An impact recorder comprising a frame, a bracket suspended from a pivot on said frame so as to assume a position of equilibrium under the action of gravity, a resisting member, recording means operatively connected to said member, a track which is inclined to the horizontal, with its upper end positioned nearer to said pivot than its lower end, and adjacent said resisting member, and a weight mounted to run up on said track under the action of inertia and to engage said resisting member; all of said elements being mounted on said bracket.

WALTER SUPPER.